United States Patent [19]

Nagao

[11] Patent Number: 5,838,780
[45] Date of Patent: Nov. 17, 1998

[54] DOUBLE-REGISTRATION AVOIDANCE METHOD FOR USE IN REGISTERING SUBSCRIBER DIRECTORY NUMBERS

[75] Inventor: Yoshiro Nagao, Kawasaki, Japan

[73] Assignee: Fujitsu Limited, Kanagawa, Japan

[21] Appl. No.: 524,231

[22] Filed: Sep. 6, 1995

[30] Foreign Application Priority Data

Jan. 25, 1995 [JP] Japan .................. 7-009430

[51] Int. Cl.⁶ .................. H04M 3/42
[52] U.S. Cl. .................. 379/213; 379/207
[58] Field of Search .................. 379/213, 111, 379/112, 214, 210, 265

[56] References Cited

U.S. PATENT DOCUMENTS

| 5,259,026 | 11/1993 | Johnson | 379/213 |
| 5,434,914 | 7/1995 | Fraser | 379/213 |

FOREIGN PATENT DOCUMENTS

| 1200763 | 8/1989 | Japan | 379/211 |
| 1205654 | 8/1989 | Japan | 379/211 |
| 6312781 | 11/1989 | Japan | 379/213 |
| 225150A | 1/1990 | Japan | 379/211 |
| 6205097 | 7/1994 | Japan | 379/211 |
| 2194709 | 3/1988 | United Kingdom | 379/211 |

*Primary Examiner*—William Cumming
*Assistant Examiner*—William G. Trost
*Attorney, Agent, or Firm*—Helfgott & Karas, P.C.

[57] ABSTRACT

In registration of subscriber directory numbers, which are assigned to subscribers connected to a PBX or connected to an office switch and formed as a group of a CENTREX, double registration should be avoided. The method for avoiding the double registration includes the steps of accumulating a plurality of request commands for updating directory numbers of a plurality of subscribers, arranging the accumulated request command, excluding conflicting request commands from the arranged and accumulated request commands, and executing remaining request commands.

10 Claims, 26 Drawing Sheets

○ PROCESSING  ⬭ FILE

☐ INPUT SIDE OR OUTPUT SIDE   ⟶ DATA

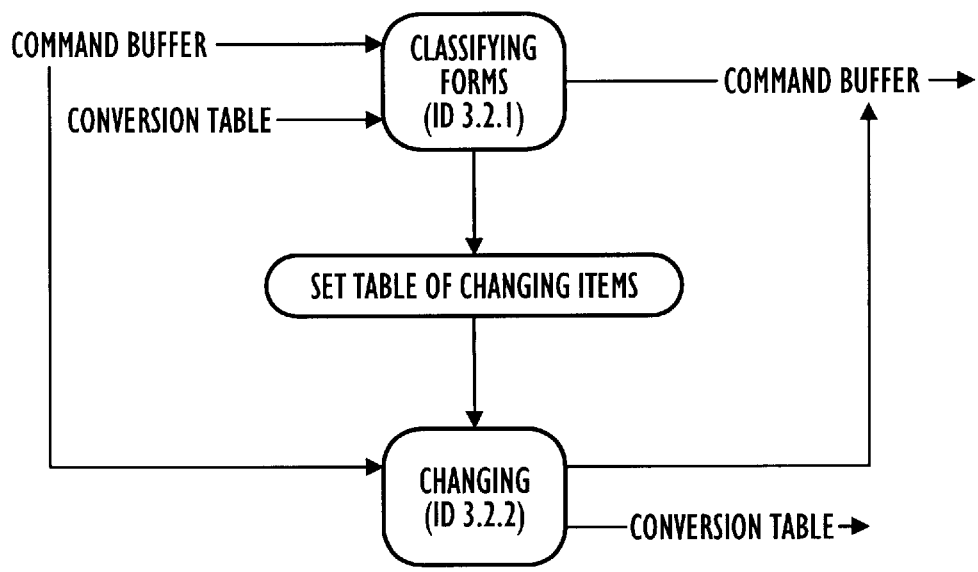

FIG. 14

| | CENTREX NUMBER | | |
|---|---|---|---|
| ITEM NO. 1 | TYPE OF REQUEST / INDICATION OF NECESSITY | CAUSE | NUMBER OF SET OF CHANGE ITEMS |
| | CASE OF ADDITION: NEW COMPLETE DN    THE CASE OF ADDITION/CHANGING: NEW INT. DN    CASE OF CHANGING/DELETION: CURRENT INT. DN | | |
| ITEM NO. 2 | TYPE OF REQUEST / INDICATION OF NECESSITY | CAUSE | NUMBER OF SET OF CHANGE ITEMS |
| | CASE OF ADDITION: NEW COMPLETE DN    THE CASE OF ADDITION/CHANGING: NEW INT. DN    CASE OF CHANGING/DELETION: CURRENT INT. DN (NOTE) | | |
| ITEM NO. 3 | TYPE OF REQUEST / INDICATION OF NECESSITY | CAUSE | NUMBER OF SET OF CHANGE ITEMS |

FIG. 15

| | REQUEST ITEMS | | | CONTENTS | INDICATION OF CAUSE |
|---|---|---|---|---|---|
| | DEL | CHG | ADD | | |
| CHECKING DUPLICATION OF NEW INT. DN (ID=2.1) | | ○ | ○ | NEW INT. DNs ARE DUPLICATED AMONG ALL CHANGED/ADDED REQUEST ITEMS | 7:NEW INT. DN DUPLICATED AMONG ITEMS |
| CHECKING DUPLICATION OF CURRENT INT. DN (ID=2.2) | ○ | ○ | | CURRENT INT. DNs ARE DUPLICATED AMONG ITEMS | 8:CURRENT INT. DN DUPLICATED AMONG ITEMS |
| CHECKING DUPLICATION OF COMPLETE DN (ID=2.3) | | | ○ | COMPLETE DNs ARE DUPLICATED AMONG ITEMS | 9:COMPLETE DN DUPLICATED AMONG ITEMS |

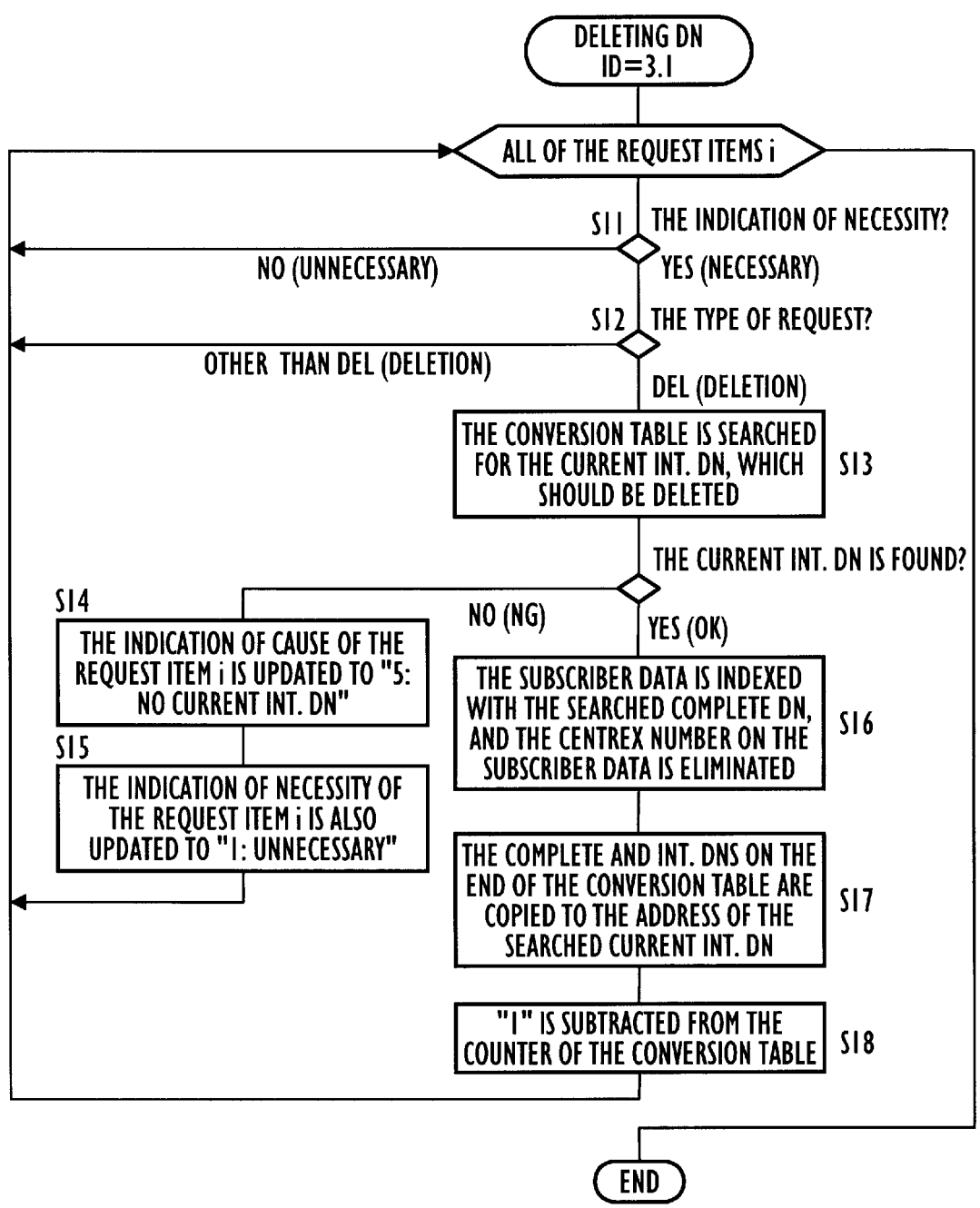

FIG. 17A
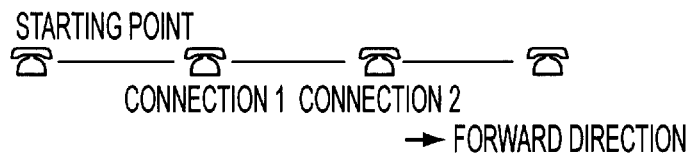
FIG. 17B
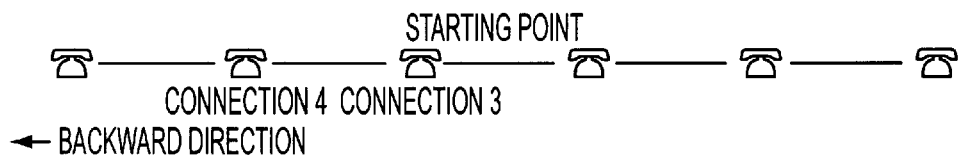
FIG. 18
| | COUNTER OF THE SET OF CHANGE ITEMS (GRNO) |
|---|---|
| SET NO. 1 | OK/NG |
| SET NO. 2 | OK/NG |
| SET NO. 3 | OK/NG |

FIG. 23

| *** REJECTION MESSAGE OF CENTREX DIRECTORY NUMBER UPDATE COMMANDS | | | |
|---|---|---|---|
| TYPE | CURRENT INT. | NEW INT. | COMPLETE DN. | CAUSE |
| ADD | | 71272832 | 7544182 | NO COMPLETE DN |
| ADD | | 71272833 | 7544183 | ALREADY IN CENTREX |
| CHG | 71272834 | 71272835 | | CURRENT DN DUPLICATED AMONG ITEMS |
| CHG | 71272835 | 71272834 | | DOUBLE REGISTRATION OF INTERCOM DN |
| DEL | 71272834 | | | CURRENT DN DUPLICATED AMONG ITEMS |
| *** END OF MESSAGE | | | | |

FIG. 26

| SET NUMBER | FORM | SYMBOL EXPRESSION |
|---|---|---|
| 1 | RING | 120 → 140 ↺ |
| 2 | RING | 121 → 142 → 130 → 141 → 122 → 150 ↺ |
| 3 | RING | 123 → 151 ↺ |
| 4 | RING | 124 → 153 → 132 → 144 → 133 → 152 ↺ |
| 5 | RING | 131 → 143 ↺ |
| 6 | RING | 134 → 154 ↺ |

FIG. 27

| ┌─FIRST SECTION─┐ | ┌SECOND SECTION┐ | ┌─THIRD SECTION─┐ | ┌FOURTH SECTION┐ | ┌─FIFTH SECTION─┐ |
|---|---|---|---|---|
| ☎ 120 | ☎ 130 | ☎ 140 | ☎ 145 | ☎ 150 |
| ☎ 121 | ☎ 131 | ☎ 141 | ☎ 146 | ☎ 151 |
| ☎ 122 | ☎ 132 | ☎ 142 | ☎ 147 | ☎ 152 |
| ☎ 123 | ☎ 133 | ☎ 143 | ☎ 148 | ☎ 153 |
| ☎ 124 | ☎ 134 | ☎ 144 | ☎ 149 | ☎ 154 |

FIG. 28

| ☎ 130 | ☎ 131 | ☎ 132 | ☎ 140 | ☎ 141 | ☎ 145 | ☎ 146 |
|---|---|---|---|---|---|---|
| ☎ 133 | ☎ 134 | ☎ 135 | ☎ 142 | ☎ 143 | ☎ 147 | ☎ 148 |
| | | ☎ 136 | | | ☎ 149 | ☎ 150 |
| | | ☎ 137 | | | ☎ 124 | ☎ 125 |
| ☎ 138 | ☎ 139 | ☎ 140 | ☎ 120 | ☎ 121 | ☎ 122 | ☎ 123 |

FIG. 29

```
***CENTREX DIRECTORY NUMBER UPDATE COMMAND INFORMATION OF OPTIMIZATION
(1) UNDERMENTIONED COMMANDS ARE NOT EXECUTABLE
TYPE   CURRENT INT.   NEW INT.   COMPLETE DN.   CAUSE
ADD                   71272832   7544182        NO COMPLETE DN
ADD                   71272833   7544183        ALREADY IN CENTREX
CHG    71272834       71272835                  CURRENT DN DUPLICATED AMONG ITEMS
CHG    71272835       71272834                  DOUBLE REGISTRATION OF INTERCOM DN
DEL    71272834                                 CURRENT DN DUPLICATED AMONG ITEMS
(2) HEREINAFTER, EXECUTES DEL COMMANDS AT FIRST.
TYPE   CURRENT INT.
DEL    71272836
DEL    71272837
DEL    71272838
DEL    71272839
(3) FOLLOW THE INSTRUCTION FOR THE UNDERMENTIONED CHG COMMANDS
SET NO. 01    71272840→71272843→71272842→71272841    LINE-FORMED SET
INSTRUCTION   EXECUTE FROM RIGHT COMMAND SUBSEQUENTLY
SET NO. 02    71272844→71272845→71272844            RING-FORMED SET
INSTRUCTION   CHANGE 71272845 TO A DUMMY INT. DN, AND SUBSEQUENTLY EXECUTE
              FROM RIGHT. CHANGE THE DUMMY INT. DN TO 71272844 AT LAST.
SET NO. 03    71272846→71272848→71272847            LINE-FORMED SET
INSTRUCTION   71272847 IS DOUBLE-REGISTERED. USE OTHER DN.
(2) EXECUTE THE UNDERMENTIONED ADD COMMANDS AT LAST.
TYPE   CURRENT INT.   NEW INT.   COMPLETE DN.
ADD                   71272849   7544199
ADD                   71272850   7544100
***END OF MESSAGE
```

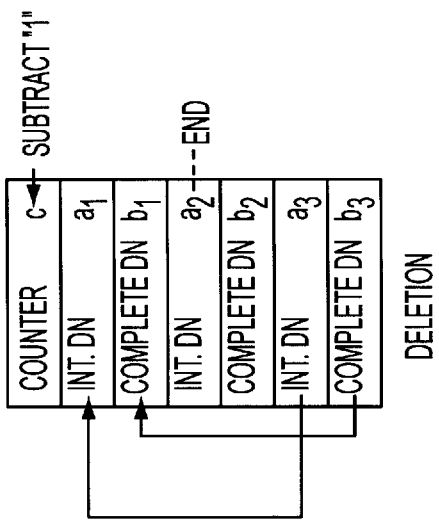
FIG. 32B PRIOR ART
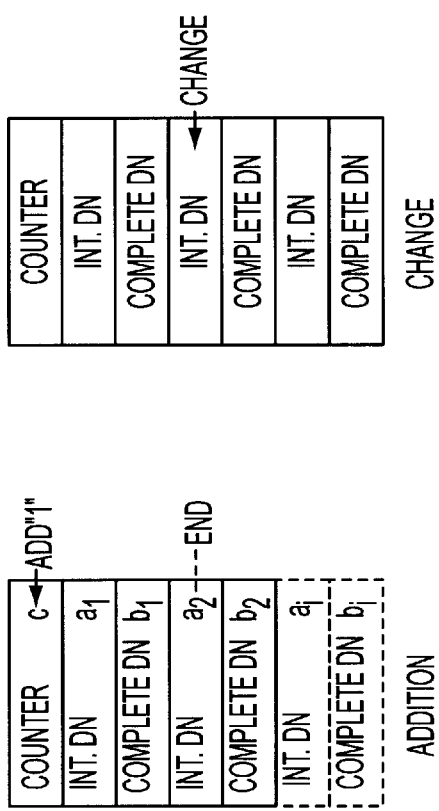
FIG. 32A
FIG. 32C

DOUBLE-REGISTRATION AVOIDANCE METHOD FOR USE IN REGISTERING SUBSCRIBER DIRECTORY NUMBERS

BACKGROUND OF THE INVENTION

1. Field of the Invention

The present invention relates to a double-registration avoidance method on processing for adding, changing or deleting data of subscriber directory numbers according to operators' commands inputted in PBXs (Private Branch Exchanger) or office switches.

2. Description of the Related Art

In recent years, there has been increased demand for CENTREX systems, which virtually constructs a network for private use in an office switch, i.e., a service system for providing a function of virtual PBX with the use of office switches, along with increased demand for PBXS.

In the CENTREX system as well as the PBX, it is necessary to manage data of complete and intercommunicative directory numbers, i.e., outline and extension directory numbers. It is also required that an intercommunicative directory number is assigned to only one subscriber in the PBX or the CENTREX system.

For the above-described conditions, a function of managing intercommunicative directory numbers in the CENTREX system will be explained as follows;

A conversion table used for converting between intercommunicative and complete directory numbers shown in FIG. 30 is provided per a CENTREX number.

The conversion table records a counter value c, which indicates a number of combinations of intercommunicative and complete directory numbers $a_i$ and $b_i$. If the intercommunicative directory number $a_i$ is dialed, the number $a_i$ is converted to the corresponding complete directory number $b_i$ according to the conversion table. Then, the subscriber data d of subscribers receiving calls are searched with a procedure shown in FIG. 31, according to the complete directory number $b_i$, and a CENTREX number CN is found to perform call-reception processing.

In the conventional CENTREX system, updating processing, such as addition, change or deletion of the intercommunicative directory numbers, has been performed as follows;

ADDITION: As shown in FIG. 32A, intercommunicative and complete directory numbers $a_i$ and $b_i$ are added to the end of the conversion table, and "1" is added to the counter value c. Then, the CENTREX number CN is written to the subscriber data corresponding to the complete directory number $b_i$ (refer to d of FIG. 31).

CHANGE: As shown in FIG. 32B, an intercommunicative directory number, which it is desired to change, is searched for in the conversion table, and the corresponding intercommunicative directory number on the table is changed.

DELETION: As shown in FIG. 32C, an intercommunicative directory number $a_i$, which it is desired to delete, is searched on the conversion table, the intercommunicative directory number $a_3$ and the complete directory number $b_3$ on the end of the table are moved to the address of $a_i$, and $b_i$, respectively, and "1" is subtracted from the counter value c. Then, the CENTREX number CN on the subscriber data d corresponding to the complete directory number is eliminated.

In the above-described addition or change processing, as shown in FIG. 33, when a new directory number corresponds to the current directory number, the directory numbers are double-registered in one table. Therefore, the command input is rejected or removed because of double-registration.

However, as shown in FIG. 34, even when a plurality of commands are inputted, if a new directory number according to a command, which should be double-registered (refer to 1024 and 1025 shown in FIG. 33), has been deleted or changed by another command, double-registration of the new number can be avoided. Further, if the directory number 1025 is added after deleting, double-registration of the number 1025 can be avoided because the former directory number 1025 has a different complete directory number from that of the latter number 1025.

Accordingly, in the conventional system, when a plurality of directory number updating commands were inputted, the system operator has changed the arrangement and inputted the commands in the optimized order to skillfully avoid the double-registration. However, it becomes increasingly difficult to arrange commands as the number of commands increases.

Further, when a large amount of commands were executed, a system operator had to input commands sequentially. Therefore, it took excessive time to execute all commands required..

Furthermore, communication is required one or more times per command between a main processor (MPR) and a call processor (CPR) for data coordinates. Thus, the communication load between the processors increases.

SUMMARY OF THE INVENTION

Accordingly, it is an object of the present invention to provide a double-registration avoidance method, by which the working time for optimizing arrangement of commands performed by system operators can be reduced by inputting all commands at once.

It is another object of the present invention to provide a double-registration avoidance method, by which the number of communication times between processors can be reduced and the load on switches is lightened.

More objects of the present invention will be clear from the following description of the preferred embodiments accompanied with drawings.

BRIEF DESCRIPTION OF THE DRAWINGS

FIG. 11 is an explanatory diagram of the process of identification (ID)=3.2 shown in FIG. 9.

FIGS. 12A through 12D show symbols used in the flow chart shown in FIG. 8.

FIG. 14 is a structural diagram of a command buffer.

FIG. 15 is a diagram showing the checking of conflicts between items.

FIG. 16 is an explanatory diagram of the process of identification (ID)=3.1 shown in FIG. 9.

FIGS. 17A and 17B are diagrams showing examples of uniting to the forward direction or the backward direction.

FIG. 18 is an explanatory diagram of content of a table for registering sets of change items.

FIG. 23 is a diagram showing one example of a rejection message of commands.

FIG. 26 is a diagram showing one example of a set of change items.

FIG. 27 is a diagram showing an example of an arrangement of directory number before moving (example 2).

FIG. 28 is a diagram showing an example of an arrangement of directory number after moving (example 2).

FIG. 29 is a diagram showing an example of a message for notifying an information of command plan.

FIGS. 32A through 32C are explanatory diagrams for updating a conversion table.

DESCRIPTION OF THE PREFERRED EMBODIMENTS

An embodiment according to the present invention will be explained, accompanied with drawings as follows. More particularly, to easily understand the present invention, a principle of a system for avoiding double-registration of commands according to the present invention will be explained at first.

Figure 34:
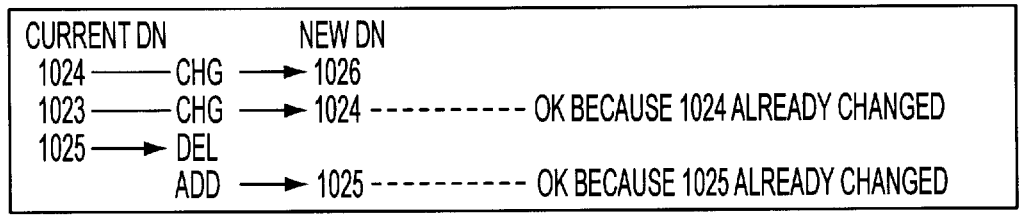
FIG. 34 is an explanatory diagram for avoiding the double-registration of commands.

First principle: Updating is optimized by performing the steps of "deletion", "change" and "addition" in order. That is, as shown in FIG. 34, if a current directory number is deleted at first, it will be possible to avoid double-registering for changing or adding after that.

Further, if changing is performed before addition, it will be also possible to avoid additional double-registering after that. Optimization of updating requests requires that "deletion", "change" and "addition" be performed in that order.

Second principle: A set of "change" can be classified into "line-formed" and "ring-formed" sets. The case where two change requests are performed will be considered as follows;

Request item 1: 1001 - changed to→1002

Request item 2: 1002 - changed to→1003

Making the two request items 1 and 2 into one, they can be expressed with a symbol as follows;

1001 - changed to→1002 - changed to→1003

Further, in the case where request items are performed in series, such as;

Request item 3: 1001 - changed to→1002

Request item 4: 1002 - changed to→1003

Figure 1:
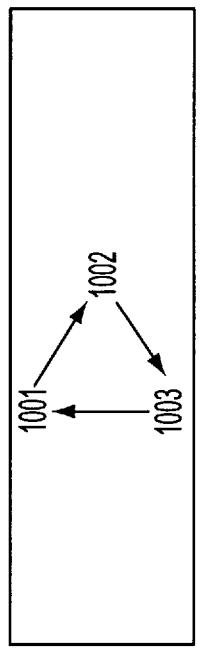
FIG. 1 is a diagram showing one example of a set of ring formed change items.

Request item 5: 1003 - changed to→1001, they can be expressed with a symbol, as shown in FIG. 1.

One or more request items are expressed with symbols, by connecting them at nodes of the corresponding new directory number and the current directory number, a set of the request items for returning to a starting point as shown in FIG. 1 is defined as a "ring-formed" set of change items.

On the other hand, a set of request items, which are not returned to a starting point, as a set of the above-described request items 1 and 2 expressed with symbols, is defined as a "line-formed" set of change items.

Figure 2:
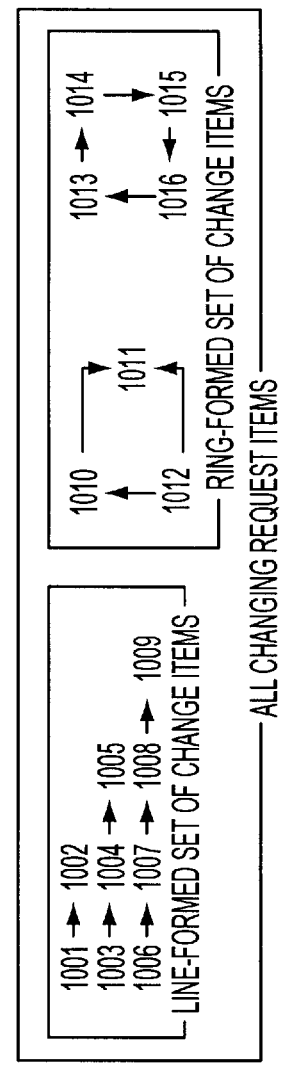
FIG. 2 is a diagram showing a classification of a line or ring formed item.

Accordingly, one or more changing request items can be classified and expressed as a cluster of a line-formed or ring-formed set of change items, as shown in FIG. 2.

Figures 3, 4:
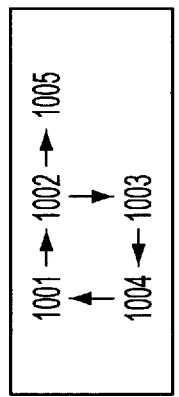
FIG. 3 is a diagram showing one example for uniting change items each other.
FIG. 4 is a diagram showing types of command rejected factors.

In a classification of the set of change items, it is impossible to combine sets of change items each other, namely, a line-formed set and a ring-formed set, as shown in FIG. 3. This is because, for example, the combination as shown in FIG. 3 means that the conflicting request items, such as, 1002 - changed to→1005 and 1002 - changed to→1003, coexist.

Third principle: It is a key in changing a line-formed set to perform the changing in a forward direction. In the above-described line-formed set of change items, such as 1001 - changed to→1002 - changed to→1003, if a changing of [1002 - changed to→1003] is completed without double-registration, changing in a backward direction, that is, [1001 - changed to→1002] also succeeds without double-registration. A direction of an arrow is called the forward direction, and the reverse direction of an arrow is called backward direction.

In this way, if the forward request item [1002 changed to→1003] is not double-registered in the line-formed set of change items, other request items can subsequently succeed in the backward direction. At last, all requested items for changing in a set can succeed.

Fourth principle: All "ring-formed" sets of change items can be realized. In the ring-formed set for change items as shown in FIG. 1, the items are rejected because of the double-registration, even if each changing item is individually requested. However, if all changing items can be concurrently performed, the double-registration cannot occur.

According to the above-described first to fourth principles, when updating requested items for addition, change or deletion, the double-registration can be more effectively avoided by performing steps (1) to (6) as follows;

Step (1): Removing conflicting requested items,

Step (2): Performing deletion of requested items,

Step (3): Classifying change requested items for changing into line-formed and ring-formed sets.

Step (4): Selecting and performing a set, of which the forward requested item is not double-registered, from line-formed sets of change items.

Step (5): Performing a ring-formed set of change items.

Step (6): Performing addition of requested items.

FIG. 4 shows a list of major rejected factors besides double-registration, in reference to the above-described step (1).

In FIG. 4, a category A is checked on an intercommunicative directory number updating procedure, which is later described, and a category B is rejected on a checking procedure of confliction among items, which is also described later. Further, this is because the rejected factors can be detected at updating. For example, the category A, which means that the requested items themselves are abnormal, includes rejected factors for addition requested items, such as a case where the complete directory number has already joined in a CENTREX system, or a case where there is no complete directory number on subscriber data.

The category A also includes a rejected factor for deletion and change request items, such as a case where there is no complete directory number in a current conversion table.

Figure 5:
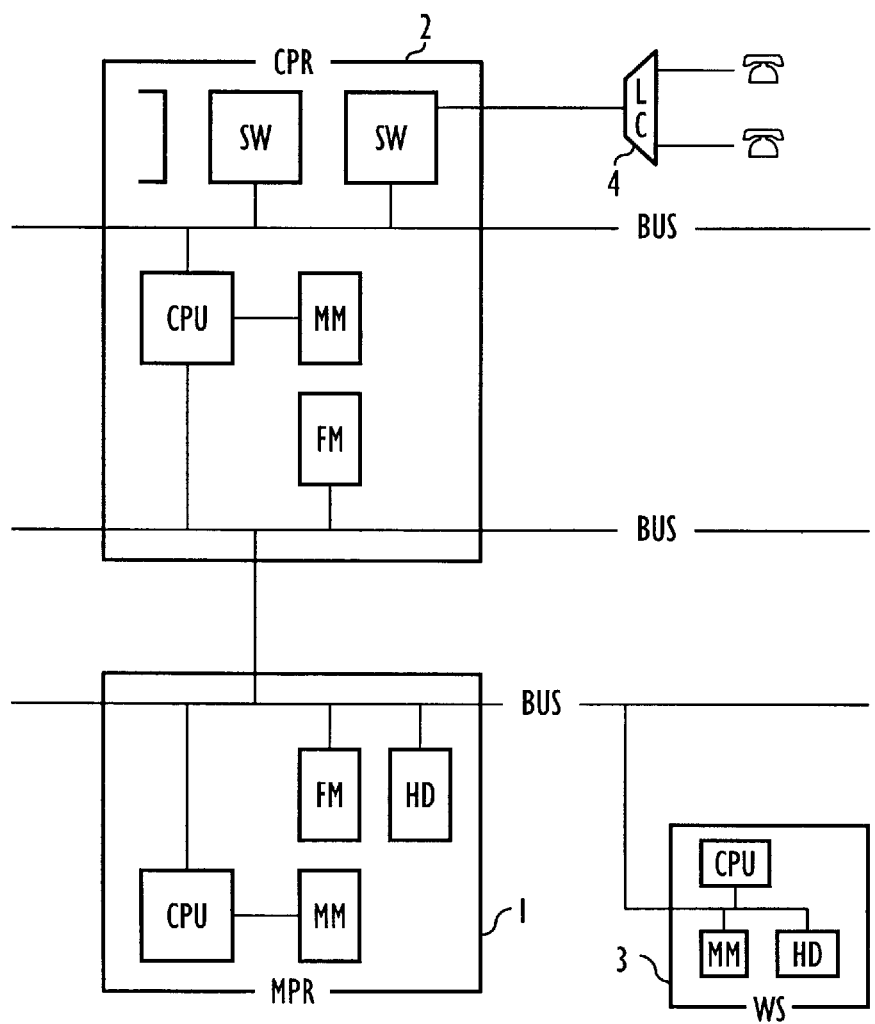
FIG. 5 is a structural block diagram of a switch according to the present invention.

FIG. 5 is a structural block diagram of a switch, to which the double-registration avoidance system is applied according to the present invention. In FIG. 5, a main processor 1 communicates with a call processor 2, and manages subscriber data or the like. The call processor 2 connects and releases a communication path.

A work station 3 provides a MMI (man machine interface) (not shown) to the main processor 1. The station 3 functions instead of the main processor 1 as needed. A reference numeral 4 is a concentrator.

Further, in each block 1 to 3, CPU means a central processor, MM is a main memory, FM is a file memory, HD is a hard disk, and SW is a network.

Figure 6A:
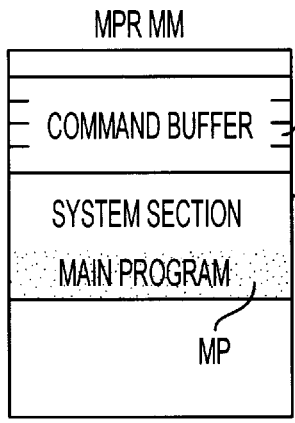
FIGS. 6A through 6F are diagrams showing memory structure, when update processing is performed in a switch.
Figure 6B:
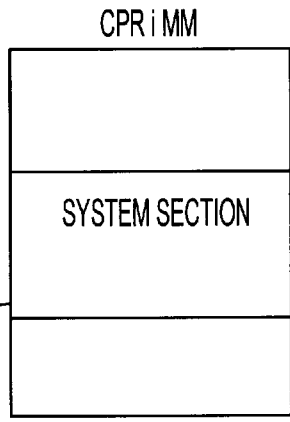
Figure 6C:
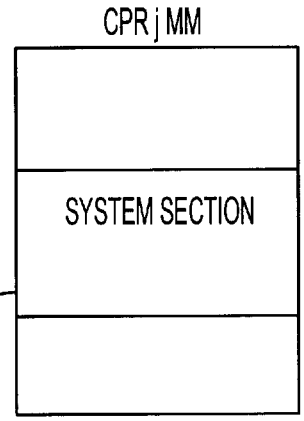
Figure 6D:
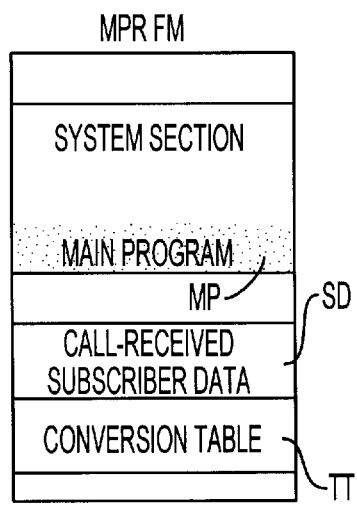
Figure 6E:
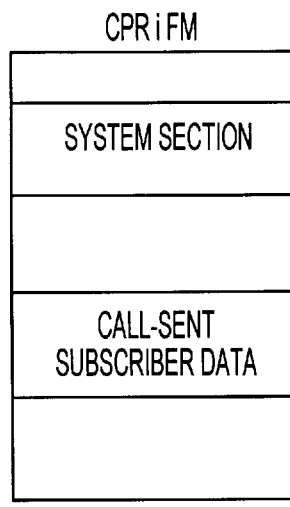
Figure 6F:
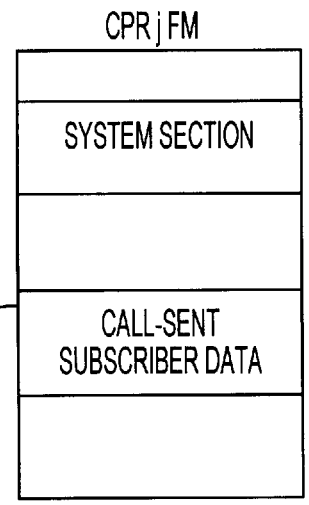
Figure 7:
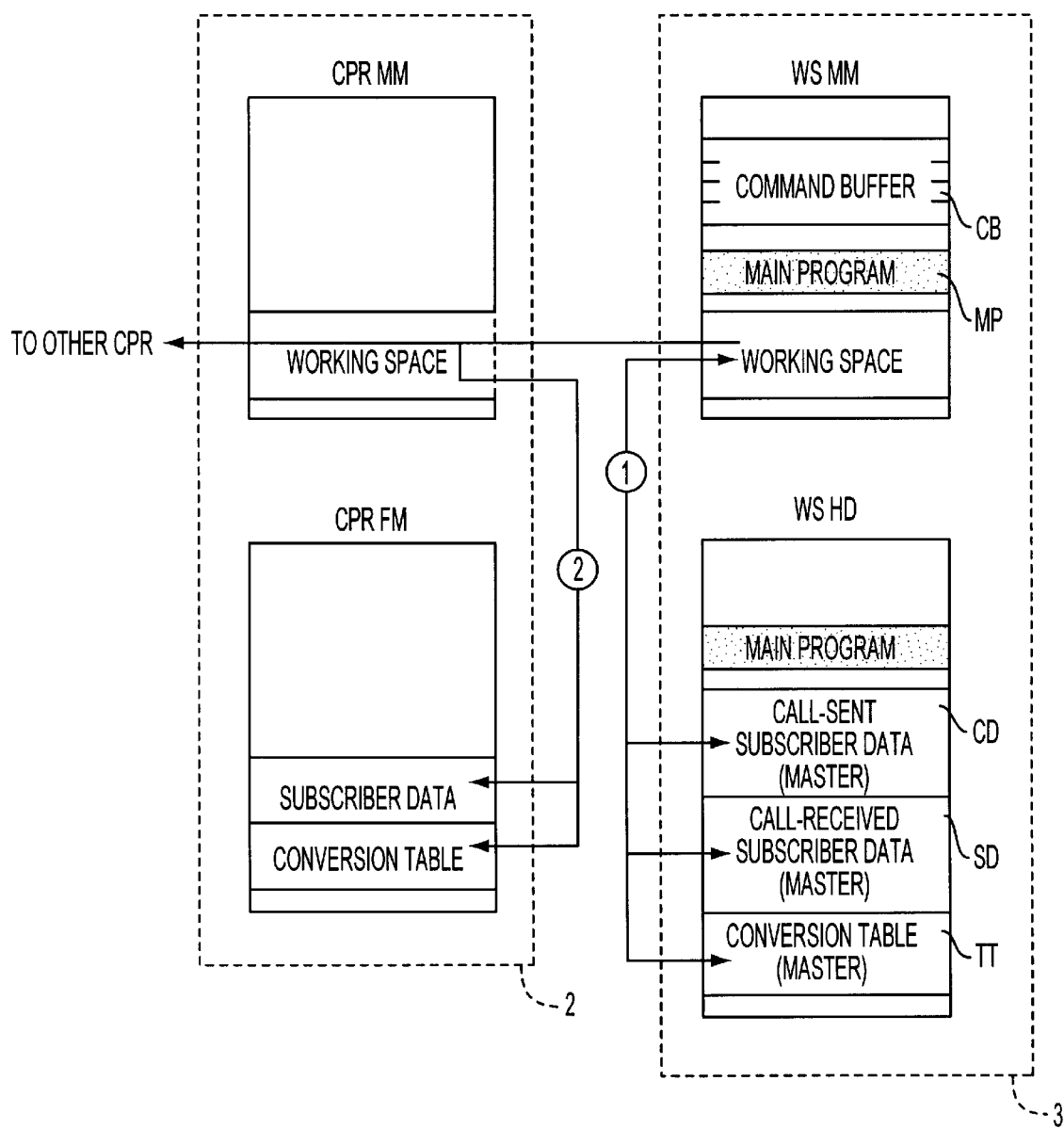
FIG. 7 is a diagram showing a memory structure, when update processing is performed by combining a switch and a work station.

In a structure of the switch, to apply to the present invention, a memory in each device is structured as shown in FIGS. 6A through 6F and 7. Further, FIGS. 6A through 6F shows examples when updating in the call processors, and FIG. 7 shows an example when updating in call processors 2 and a work station 3.

FIG. 6A shows a content of the main memory MM of a main processor 1, FIG. 6B shows a content of a main memory MM of the ith call processor 2, and FIG. 6C shows a content of a main memory MM of the jth call processor 2. Further, FIG. 6D shows a content of a file memory FM of a main processor 1, FIG. 6E shows a content of a file memory FM of the ith call processor 2, and FIG. 6F shows a content of a file memory FM of the jth call processor 2.

The main memory MM of the main processor 1 stores a main program MP for executing and controlling the system according to the present invention. Further, the main memory MM stores a command buffer CB. A required number of memory faces are used according to the command request in the command buffer CB.

Each system program is stored in each system section SS of the main memories MM of the main processor I and the call processor 2.

On the other hand, a file memory FM of the main processor 1 also stores a main program MP to execute and control the system according to the present invention. Further, a file memory FM of the main processor 1 stores a call-received subscriber data section SD and a conversion table TT.

A file memory FM of the call program 2 stores a call-sent subscriber data section CD. Further, each system program is stored in each system section SS of each file memory FM of the main processor 1 and the call processor 2.

In the case where call processors 2 and a work station 3 are combined to use as shown in FIG. 7, a command buffer CB and a main program for controlling the present system are stored in the work station 3. The work station 3 also stores master data of a conversion table TT, a call-sent or call-received subscriber data CD or SD.

When supplying commands, it is performed in the work station 3 at first to update the call-sent subscriber data CD, the call-received subscriber data SD and the conversion table TT (refer to (1) of FIG. 7). Then the remainder, obtained from the updating procedure, is transferred to the side of a switch to update data of the main processor 1 and the call processor 2 (refer to (2) of FIG. 7).

In a system for employing the work station 3, an advanced man machine interface as the work station 3 can be employed. Further, there is the advantage that efficiency can be improved by dividing into a switch processing group and an operating group.

Figure 8:
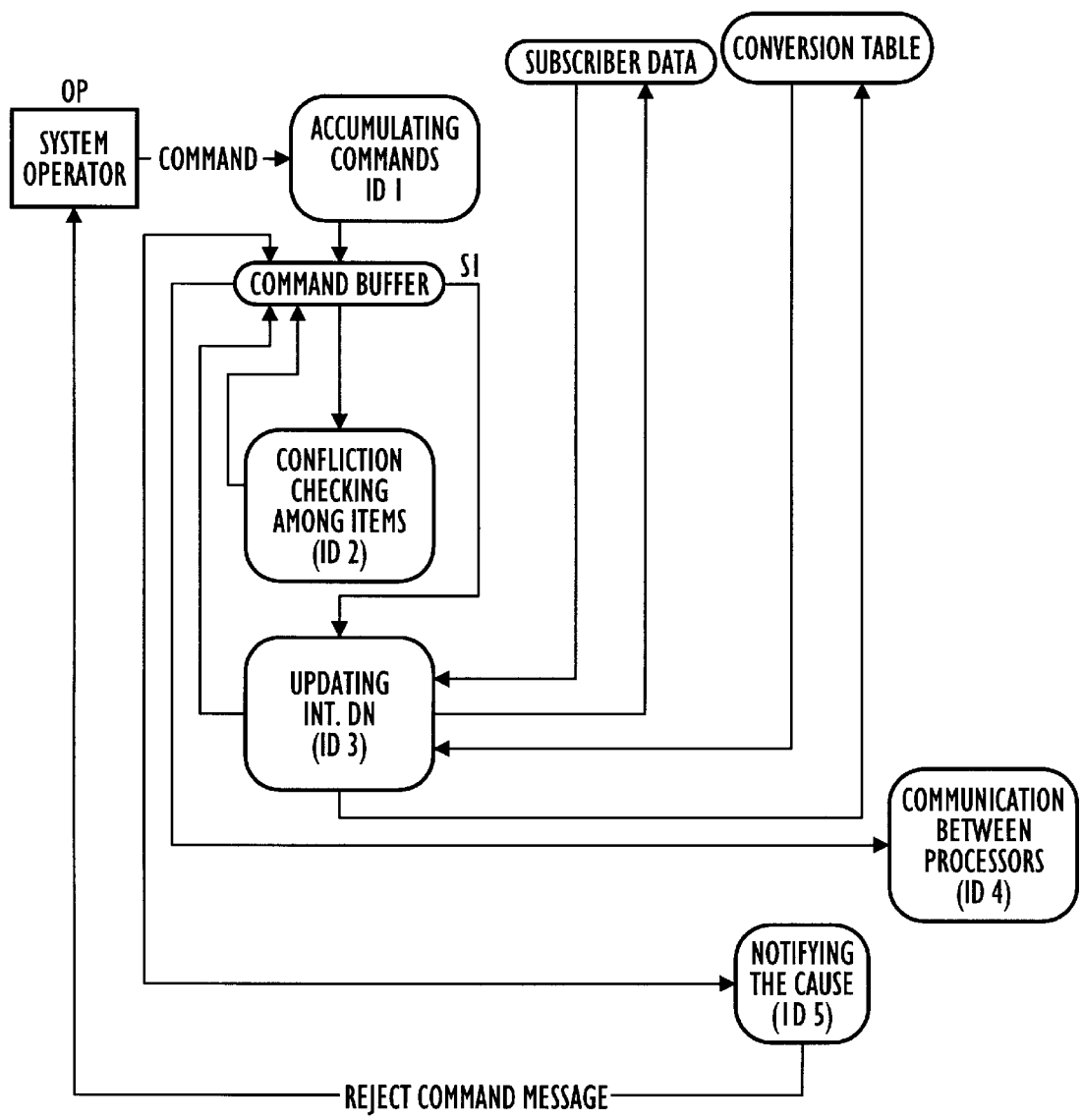
FIG. 8 is a data flow diagram according to a system of the present invention showing the highest level of identifications (ID's) of command types.

FIG. 8 is a data flow chart according to the present system, which is applied to a memory structure as explained above in FIGS. 5, FIGS. 6 and 7, and can reduce the times for communicating between processors, and also reduce the times for rejecting the intercommunicative directory number updating commands for addition, change, and deletion in the CENTREX system as an embodiment.

In FIG. 8, the system operator collectively inputs a plurality of the intercommunicative directory updating commands for one CENTREX system. After finishing input of the commands, it is performed by employing the principles for avoiding double-registration, which has been already explained, to update (delete, change, or add) the intercommunicative directory numbers. Any rejected command request is outputted as a reject command message on a display or the like.

FIG. 12A through 12D show the meanings of symbols employed in the flow charts of FIGS. 8 through 11. FIG. 12A depicts a symbol connoting processing, FIG. 12B depicts a symbol connoting a file, FIG. 12C depicts a symbol connoting an inputted section or an outputted section, and further FIG. 12D depicts a symbol connoting a flow of data.

Figure 13:
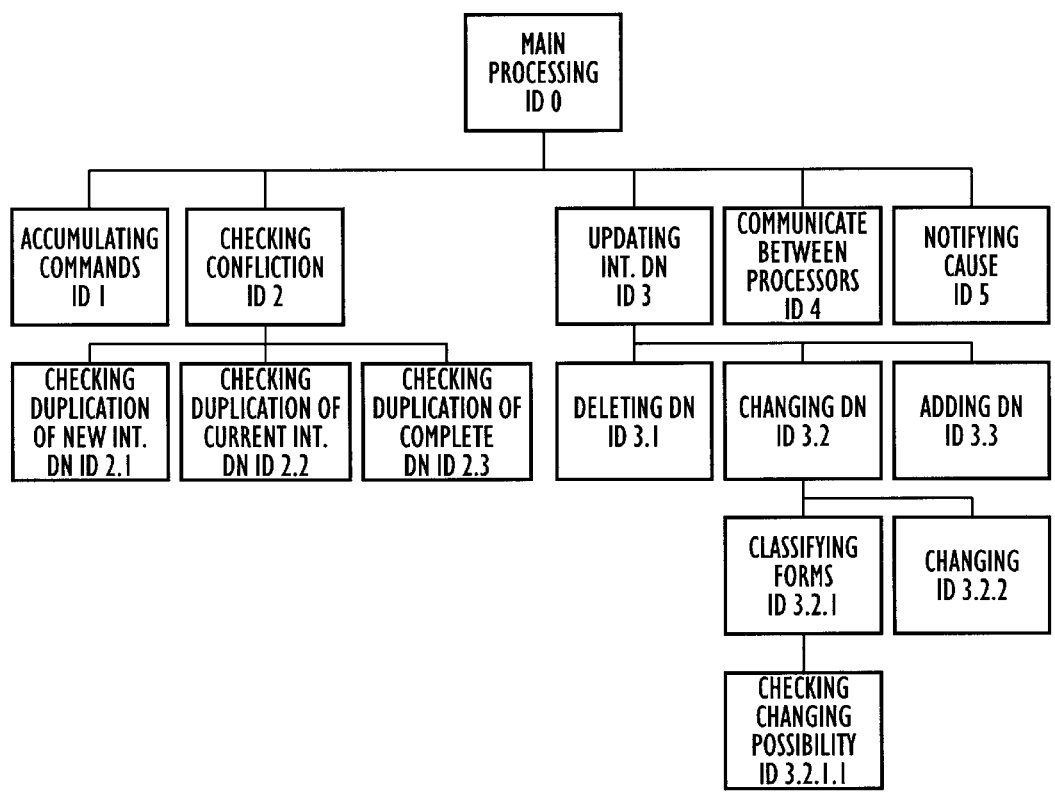
FIG. 13 is a diagram showing a task structure shown in FIG. 8 delineating all levels of identifications (ID's) of command types.

Further, the structure of task processing classified according to the flow of the data is shown in FIG. 13. A main task function in the task structure will be explained in conjunction with a data flow diagram shown in FIG. 8.

In FIG. 8, the system operator OP inputs each command at first to accumulate (identification (ID) (from FIG. 13)=1) a plurality of the intercommunicative directory number commands, and write the accumulated commands (STEP S1). Then, accumulating processing means to accumulate intercommunicative directory number updating commands, which the system operator OP inputs with the keyboard, in a processor 1 or a command buffer CB of the work station 3.

Then, the command buffer CB is structured as shown in FIG. 14. The indications of necessity, which show whether or not updating is required, for all request items in the command buffer are set to "O: Necessary", the indication of "cause" is set to "O: Normal completion", and the indication of "number of the set of change items" is set to "undefined" on initialization.

In FIG. 14, an area is employed as a new complete directory number on addition, and employed as a current intercommunicative directory number on changing or deletion. This is so that memory can be saved as both directory numbers do not coexist. If a memory for command buffering has enough capacity, other areas may be used.

The control information of the request items in FIG. 14 is defined as having a content as one example, as follows;

Type of request
=0: invalid, 1: ADD (add),
2: CHG (change), 3: DEL (delete)
Indication of necessity
=I: unnecessary, 0: necessary
(provided that the initial value is 0)
Cause
=0: Normal completion (initial value)
=1: Double-registration of intercommunicative directory numbers.
=2: Double-registration of complete directory numbers.
=3: Already in Centrex.
=4: No complete directory number on the subscriber data.
=5: No current intercommunicative directory number.
=6: New intercommunicative directory number duplicated among items.
=7: Current intercommunicative directory numbers duplicated among items.
=8: Complete directory numbers duplicated among items.
=9: Faults on communicating between processors. Number of a set of change items
(initial value 0=undefined)

Next, existence of conflict among items is checked for the content of command written and accumulated in the above-described command buffer CB (ID 2). Thereby, it becomes possible to reject the conflicting request items.

Figure 9:
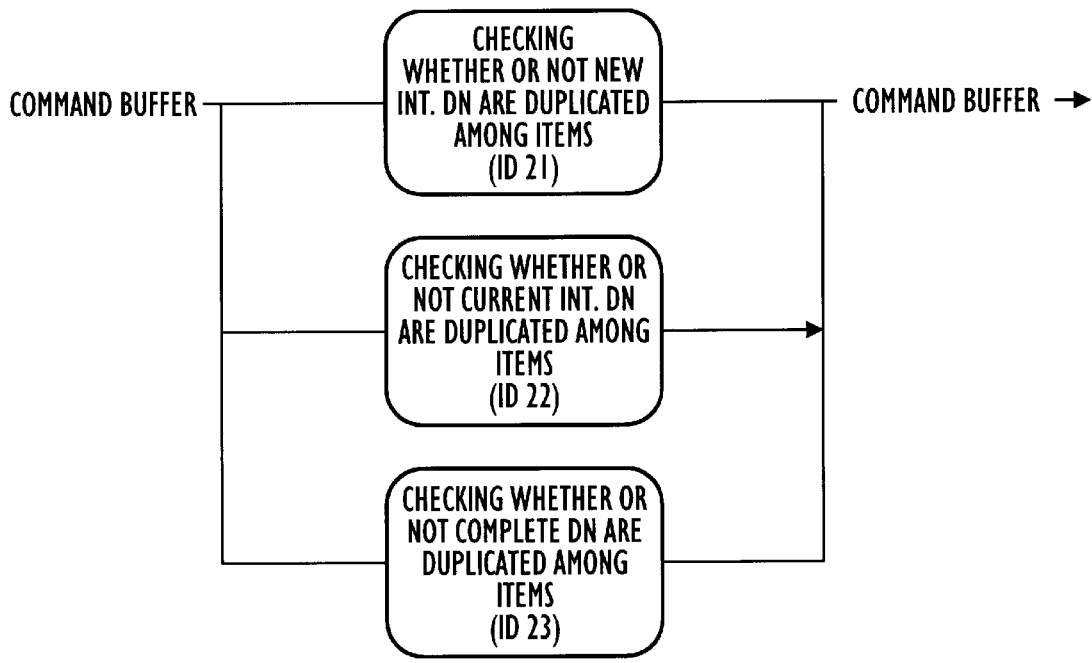
FIG. 9 is an explanatory diagram of the process of identification (ID)=2 shown in FIG. 8 in detail.

The check for conflict among items includes the contents as shown in FIG. 9, that is, contents belonging to the category B of the rejected factors of command above-explained in FIG. 4.

In the contents, first it is determined whether new intercommunicative directory numbers are duplicated among items (ID=2.1), namely, it is determined whether new intercommunicative directory numbers are duplicated among all request items for changing or adding. Then, indications of necessity of all the duplicated request items are re-written to "1: Unnecessary", and the indications of "causes" of duplicated request items are also re-written to "6 : New intercommunicative directory number duplicated among items", for example, it corresponds to that a relationship of 1002 changed to→1005 and 1003 changed to→1005 as shown in FIG. 3.

Secondly, it is determined whether the current intercommunicative directory numbers are duplicated among items (ID=2.2) to check whether or not the current intercommunicative directory numbers are duplicated among all of the request commands for changing or deleting. Then, indications of necessity of duplicate request items are rewritten to "1: Unnecessary", and all indications of cause of duplicated request items are also re-written to "7: Current intercommunicative directory number duplicated among items".

Thirdly, it is determined whether the complete directory numbers are duplicated among items (ID=2.3) to check whether or not the complete directory numbers are duplicated among all of the request items for adding. Then, all indications of necessity of duplicated request items are re-written to "1: Unnecessary", and their indications of cause are re-written to "8: outline directory number duplicated among items".

FIG. 15 is a list showing the contents of the above-described checking for conflicts among the items. The main processor 1 or the work station 3, which stores a command buffer CB, checks for conflicts among the items then updating processing (ID=3) of the intercommunicative directory numbers is executed based on the contents, which are re-written to the command buffer CB.

Figure 10:
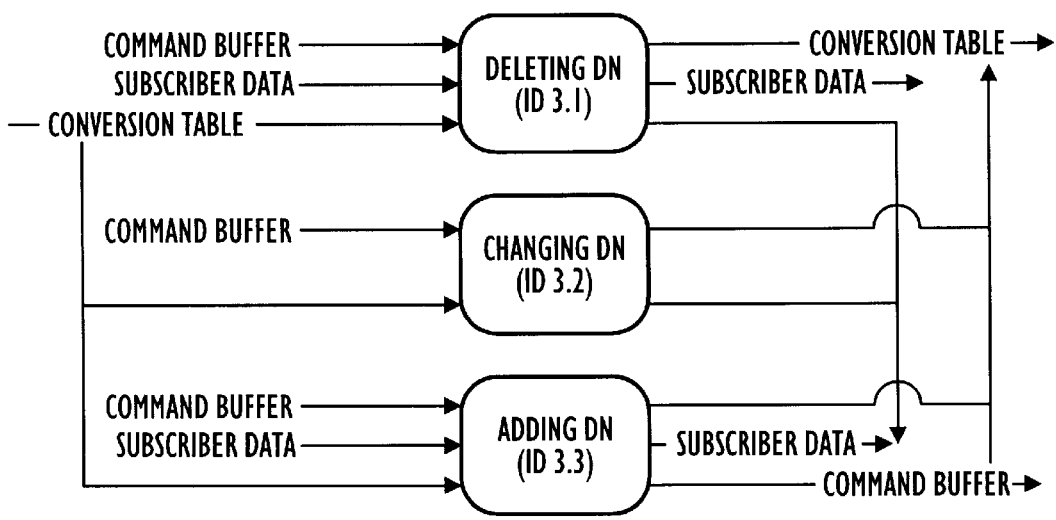
FIG. 10 is an explanatory diagram of the process of identification (ID)=3 shown in FIG. 8 in detail.

FIG. 10 shows a detailed content of updating the intercommunicative directory numbers (ID=3). On the updating processing of the intercommunicative directory numbers, inputs are considered as input data of the command buffer, subscriber data, and data of the conversion table, and the outputs are sent to the command buffer, the subscriber data, and the conversion table as indicated by arrows in FIG. 10. The updating processing has a function for extracting request items from the command buffer, updating the conversion table, and updating a CENTREX number on the subscriber data.

Figure 31:
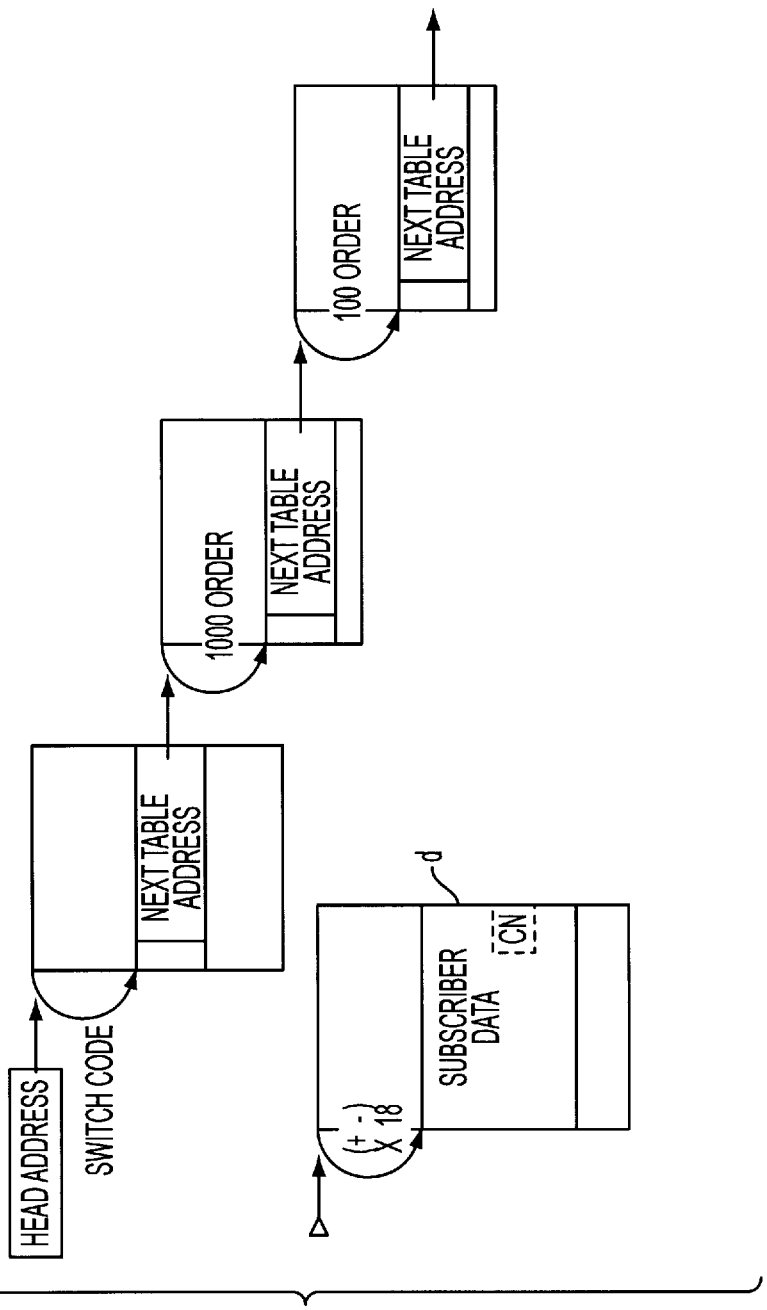
FIG. 31 is a diagram for explaining a method for indexing subscriber data.
Figure 33:
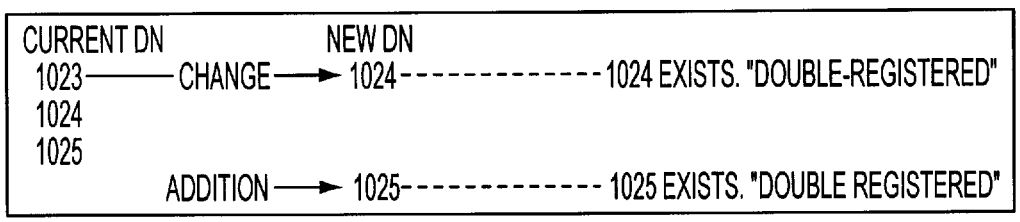
FIG. 33 is an explanatory diagram of double-registration of commands.

In FIG. 10, the directory number is deleted (ID=3.1), based on the content of the command buffer CB, subscriber data d (refer to FIG. 31) and the conversion table TT (refer to FIG. 32) at first. That is, deletion is performed of the request items, whose type is "3: DEL (delete)", from the conversion table, and the CENTREX number on the appropriate subscriber data is eliminated.

Secondly, the directory number changing processing (ID=3.2) is performed, based on the content of the command buffer CB and the conversion table TT. The conversion table of the request items, type of which is "2: CHG (change)", is changed.

Finally, the directory number adding processing (ID=3.3) is performed, based on the content of the command buffer CB, the subscriber data d and the conversion table TT. The conversion table for the request items, type of which is "1: ADD (add)", is added, and the CENTREX number is written on the appropriate subscriber data.

Further, each function of deleting (ID=3.1), changing (ID=3.2), and adding (ID=3.3)-directory numbers will be explained in detail as follows;

FIG. 16 shows a detailed operational flow chart of deleting directory numbers (ID=3.1). The command buffer, the subscriber data, and the data of the conversion table are considered as inputs and the outputs are sent to the command buffer, the subscriber data, and the conversion table. The request items are extracted from the command buffer. Deletion is performed of the request items, type of which is "3: DEL (delete)", and the indication of necessity is "O: Necessary".

In FIG. 16, all of the ith request items are performed by the following processing;

It is determined whether there is an indication of necessity, which shows updating is required (STEP S11). If the indication of necessity is "O: Necessary", the request type is determined (STEP S12).

When the request type is "3: DEL (delete)", the conversion table is searched for the current intercommunicative directory number, which should be deleted (STEP S13). If the current intercommunicative directory number to be deleted is not found by the search, the indication of cause of the request item i is updated to "5: No current intercommunicative directory number on the subscriber data (STEP S14), and further, the indication of necessity of the request item i is also updated to "1: Unnecessary" (STEP S15).

On the other hand, when the current intercommunicative directory number is found by searching in step S13, the subscriber data is indexed with the searched complete directory number, and the CENTREX number on the subscriber data is eliminated (STEP S16).

Then, the complete and intercommunicative directory numbers on the end of the conversion table are copied to the address of the searched current intercommunicative directory number (STEP S17), and "1" is subtracted from the counter of the conversion table (STEP S18).

Next, changing of directory numbers (ID=3.2) will be explained in detail. On the change processing, the command buffer, and data of the conversion table are set as inputs, and the outputs are sent to the command buffer and the conversion table. The request items are extracted from the command buffer, the converted request items are classified to the line-formed or ring-formed set of change items by the step of "line-form or ring-form classification (ID=3.2.1), and the items are registered in the set table of changing items.

Then, a set of change items is extracted from the table of changing items by the step of "performing changing (ID=3.2.2)", and the request items included in the executable set of change items are performed.

The above-described line-form or ring-form classification (ID=3.2.1) will be explained. The command buffer and the data of the conversion table are considered as inputs, and the outputs are sent to the command buffer and the table of the set of change items. The request items are extracted from the command buffer, and the request items, which becomes "ENABLED" on the process of "checking of changing possibility (ID=3.2.1.1)", are connected with the use of the operation described above in the explanation of the second principle of the double-registration avoidance system as follows:

The connecting operation is performed from the extracted request item, which is a starting point, to the forward direction [refer to FIG. 17A]. After connecting to the forward direction, and finding it is in line form, it is decided that all request items in the set are "ENABLED (OK)" or "DISABLED (NG)" according to the determination of whether a new intercommunicative directory number of "the forward" request item is double-registered.

In the case of the ring-formed set, all request items in the set become "ENABLED (OK)". In the case of the line-formed set, as shown in FIG. 17B, connection is performed from the extracted request item, which is a starting point, in the backward direction. As shown in FIG. 18, the connected sets of change items are registered in the table of the sets of changing items.

Figure 19:
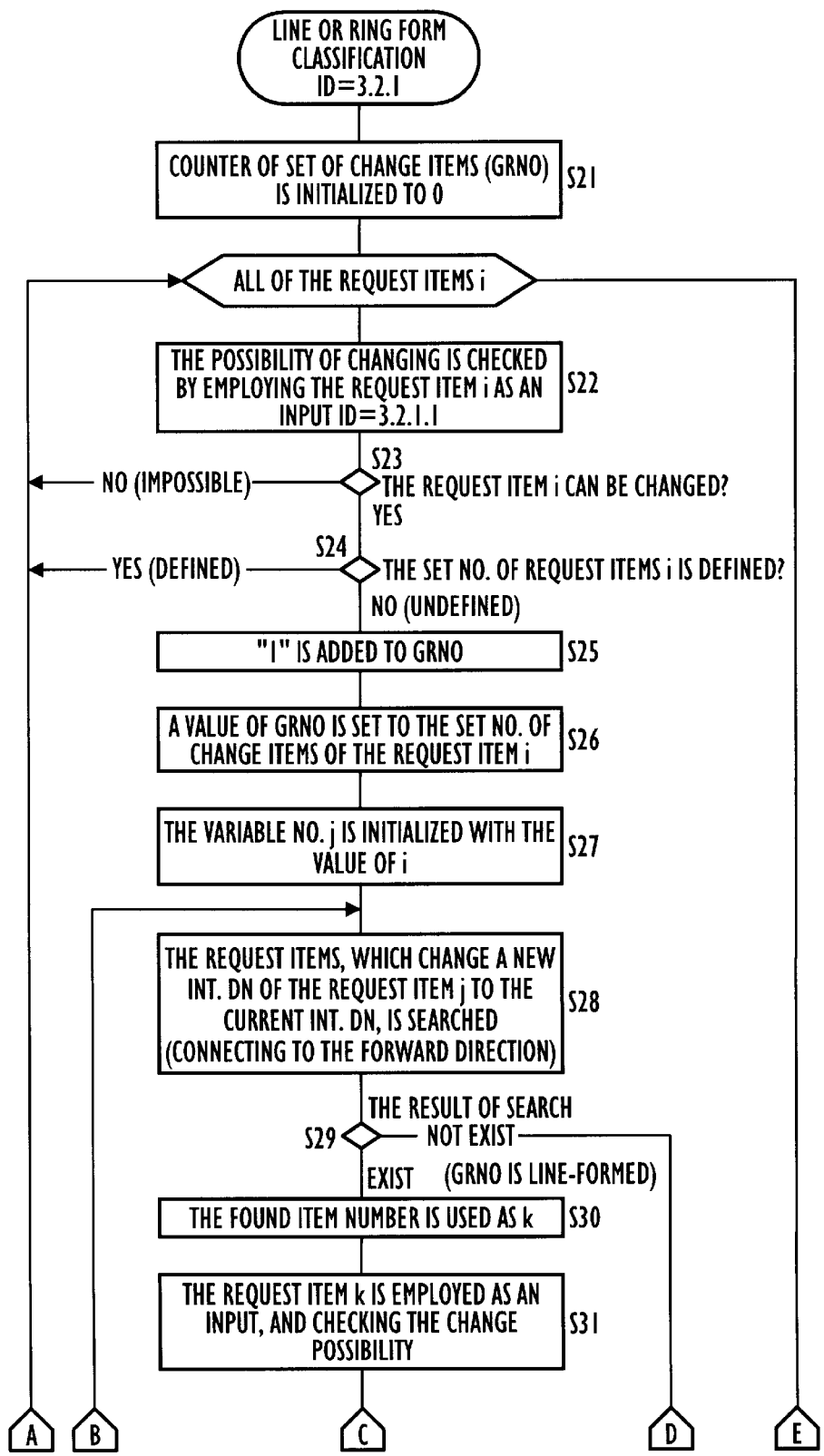
FIG. 19 is an operational flow chart (No. 1) of line or ring formed classification processing.
Figure 20:
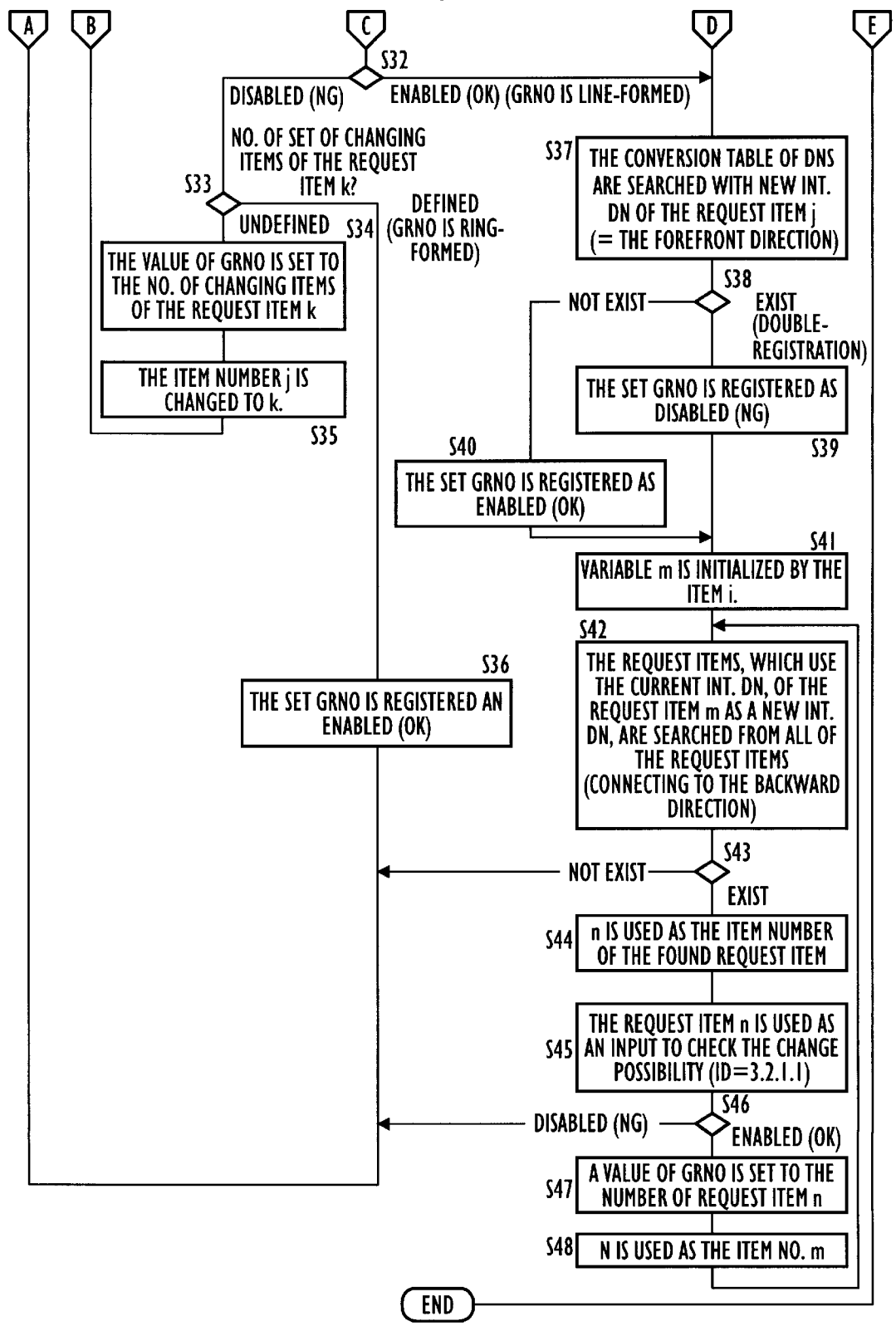
FIG. 20 is an operational flow chart (No. 2) of line or ring formed classification processing.

The line or ring form classification (ID=3.2.1) is performed according to the operational flow charts shown in FIGS. 19 and 20 in detail. At first, a counter of the set of changing items (GRNO) [refer to FIG. 18] is initialized to 0 (STEP S21).

All of the ith request items are processed as follows:

The possibility of changing is checked by employing the request item i as an input (STEP S22). The content of checking the possibility of changing (ID=3.2.1.1) will be explained in conjunction with FIG. 21.

It is determined whether the request item i can be changed (STEP S23). If the item i can be changed, it is determined whether the number of the set of the change items of the request items i is defined (STEP S24). If the number is undefined, "1" is added to the counter of the set of change items (GRNO) (STEP S25).

A value of the counter (GRNO) of the set of changing items is set to the number of the set of change items of the request item i (STEP S26). Then, the variable number j is initialized with the value of i (STEP S27), and the request items, which change a new intercommunicative directory number of the request item j to the current intercommunicative directory number, is searched (connecting to the forward direction) (STEP S28).

Figure 21:
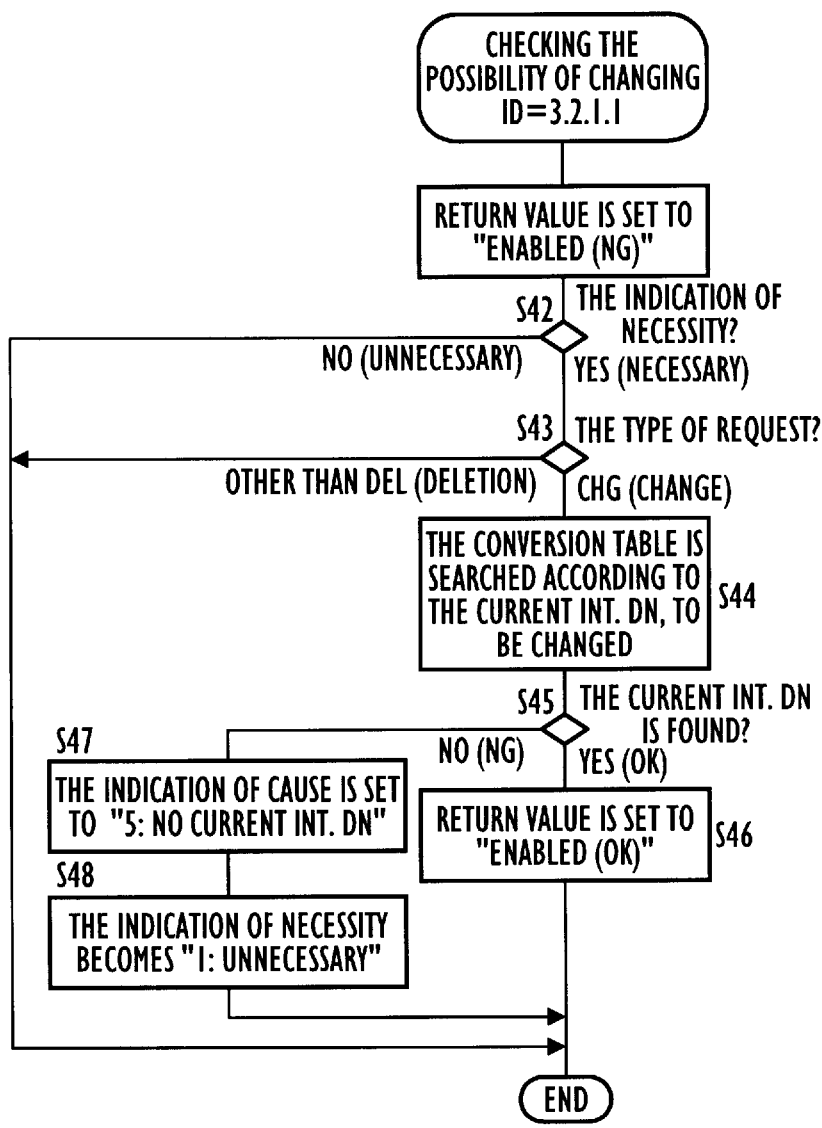
FIG. 21 is a detailed flow chart of checking possibility ifentification (Id)=3.2.1.1).

The object of the search is a request item which changes a new intercommunicative directory number of the request item j to the current intercommunicative directory number (STEP S29). If there is a request item, the found item number is used as k (STEP S30), the request item k is employed as an input, and checking the changing possibility (ID=3.2.1.1) (STEP S31), which is explained in FIG. 21, is performed.

The result of checking the changing possibility is determined (STEP S32). If it is "ENABLED (OK)", the number of the set of changing items of the request item k is judged (STEP S33), whereas the value of counter of the set of changing items (GRNO) is set, i.e., connected, to the number of the set of changing items of the request item k (STEP S34). The item number j is changed to k (STEP S35), and the processing is returned to the step S28.

Further, it is determined that the number of the set of change items of the request item k is defined on the step S33, that is, the set of change items is a ring-formed, the processing is returned to the next request item (STEP S36).

On the other hand, in the case where the item can not be updated in the step S32 (the set of change items is line-formed), the conversion table of directory numbers is searched for the new intercommunicative directory number of the request item j (=the forward direction), as well as the case where it is determined that there is no connection to the forward direction on the step S29 (STEP S37). If it is determined in (STEP S38) that there is a double-registration, the set of change item (GRNO) is registered as impossible changing (NG)(STEP S39).

If there is no double-registration, a set of change items (GRNO) is registered as "ENABLED (OK)" (STEP S40). Then, the variable m is initialized by the item i (STEP S41).

Next, the request items, which use the current intercommunicative directory number of the request item m as a new intercommunicative directory number are searched from all of the request items (in the backward direction) (STEP S42). The result of the search is determined (STEP S43) If the item is not found, the next processing of the request items is continued.

If the item is found, n is used as the item number of the found request item (STEP S44).

Then, the request item n is used as an input to check the change possibility (ID=3.2.1.1) according to the operational flow chart shown in FIG. 21 (STEP S45). The result of checking the change possibility is determined (STEP S46). If the items can be changed, a value of the counter of the set of change items (GRNO) is set, i.e., connected, to the number of request item n (STEP S47). Further, n is used as the item number m, and the next processing of the request items is continued (STEP S48).

On the other hand, if the result of checking the possibility is "DISABLE. (NG)" on the step S46, the next processing of the request items are continued.

The processing of checking the possibility (STEPs S21, S31, and S45) shown in the flow charts of line or ring formed classification processing of FIGS. 19 and 20, which are discussed above, is performed according to a flow chart shown in FIG. 21.

In the processing of checking the change possibility (ID=3.2.1.1), the conversion table, the command buffer, the number of the request item are set as inputs, and the command buffer is used as an output. Then, it is determined whether the return value is "ENABLED (OK)", and the inputted request items can be executed, to return the value as a return value. If the items are not executable, the command buffer is further updated.

FIG. 21 shows the detailed content of checking the change possibility. At first, the return value is set to "DISABLED (NG)" (STEP S41). Then, the existence of the indication of necessity is judged (STEP S42). If the indication of necessity is "O: Necessary", the type is judged (STEP S43). If the type is "2: CHG (change)", the conversion table is searched with the current intercommunicative directory number to be changed (STEP S44). It is determined whether the current intercommunicative directory number to be changed is found (STEP S45). If the directory number is found, the return value is set to "ENABLED (OK)" (STEP S46).

On the other hand, in the case where the indication of necessity is "1: Unnecessary" on the step S42, or the case where the type is other than "2: CHG (change)", the processing is finished. Further, when the current intercommunicative directory number to be changed cannot be found, the indication of "cause" is set to "5: No current intercommunicative directory number" (Step S47). Further, the indication of necessity becomes "1: Unnecessary" (STEP S48).

Figure 22:
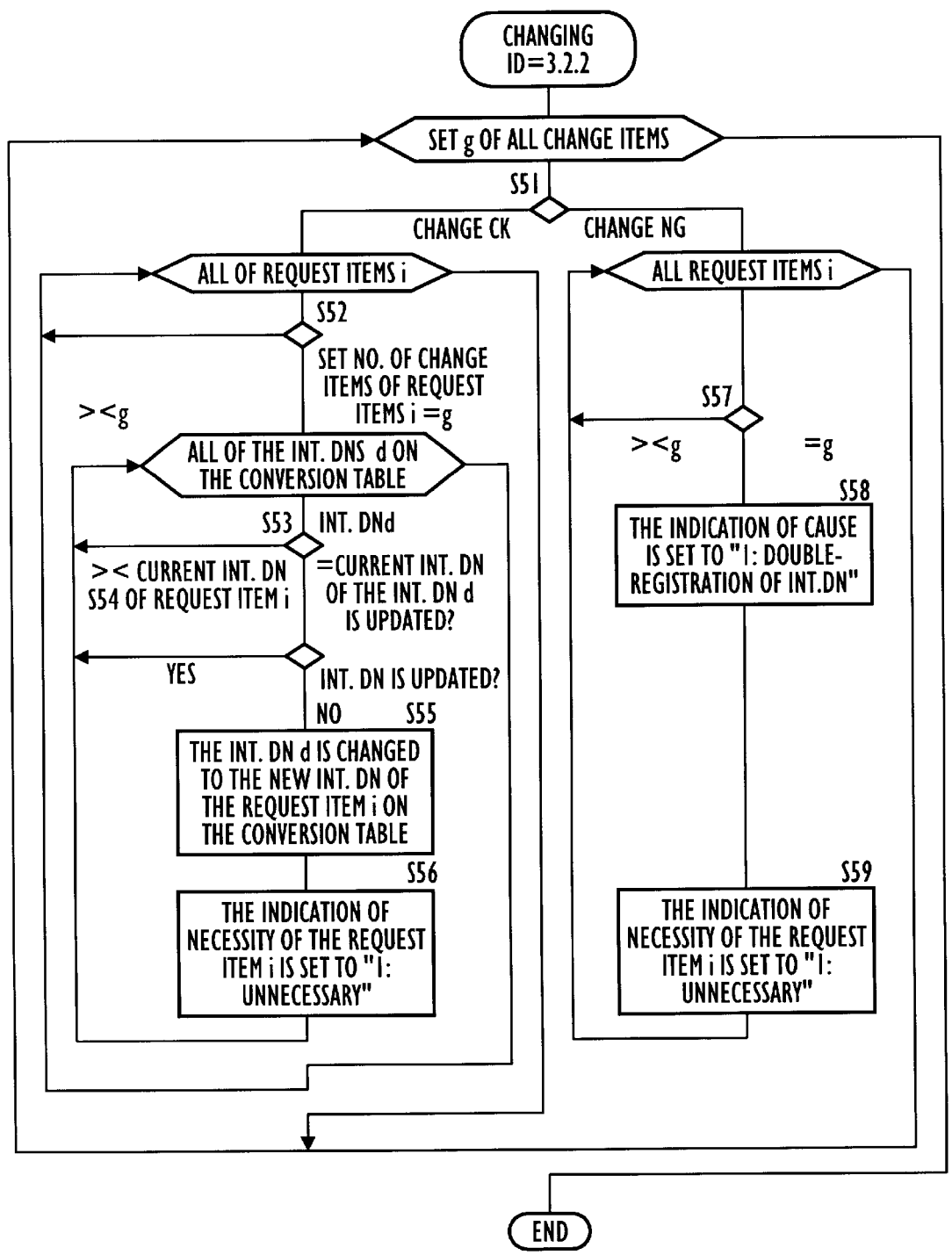
FIG. 22 is a detailed flow chart of changing processing identification (Id)=3.2.2).

FIG. 22 shows an operational flow chart for the step of "performing changing (ID=3.2.1)". The command buffer and the data of the table of the set of change items are inputted, and the outputs are sent to the command buffer and the conversion table as data of the table of the set of change items.

Sets which are executable (OK) are extracted from the sets of change items, which are registered in the table for registering the sets of change items, and all of the request items having the set number of change items are performed.

The set of change items registered in the table for registering the sets of change items is determined (STEP S51). The changeable items having the numbers i, it is determined whether the number of the change set is g (STEP S52). If the number of the change set is g, it is judged whether or not all intercommunicative directory number d on the conversion table is the current intercommunicative directory number of the request item i (STEP S53).

If the directory number d is the current intercommunicative directory number of the request item i, it is judged whether or not the intercommunicative directory number d is updated (STEP S54). If the directory number is not updated, the intercommunicative directory number d is changed to the new intercommunicative directory number of the request item i on the conversion table (STEP S55). Then, the indication of necessity of the request item i becomes "1: Unnecessary" (STEP S56). The processing is repeated for all request items each having the number i.

If the change set item g is "DISABLED (NG)" on the step S51, it is judged whether or not the number of the set of change items of the request item i is g (STEP S57). If the number is g, the indication of "CAUSE" becomes "1: Double-registration of intercommunicative directory number" (STEP S58). Then, the indication of necessity of the request item i is set to "1: Unnecessary" (STEP S59).

Referring now to the data flow diagram shown in FIG. 8 and the task structure shown in FIG. 13, there is a function for adding the directory number (ID=3.3) of the updating of intercommunicative directory number (ID=3). The command buffer, the subscriber data, and the data of the conversion table are inputted, and the data is outputted to the command buffer, the subscriber data, and the conversion table.

The request items are extracted from the command buffer. For each request item, of which type is "1: ADD" and indication of necessity is "O: Necessary", addition is performed.

Further, according to the data flow diagram shown in FIG. 8 and the task structure shown in FIG. 13, there is a communication between the processors. In the communication, the data of the command buffer are inputted, and the data are outputted to the command buffer.

The times for communicating between the processors can be reduced. The process is started after receiving the completion of the process ID=3 (updating the intercommunicative directory number). Each item, of which indication of cause is "O: Normal completion (initial value)" on the command buffer, is placed on the buffer for communication between the processors and sent to the call processor 2.

If a fault is found in communication between the processors, retries are attempted. After a predetermined time a code of NG is generated, and a request for restoring is generated and sent to the main processor 1.

Further, in the data flowing diagram shown in FIG. 8 and the task structure shown in FIG. 13, on the step of notification of cause (ID=5), the data of the command buffer is inputted, and the data is outputted as a rejection message.

The notification is started after receiving the completion of the process ID=4 (communication between processors). on the structure of the command buffer as shown in FIG. 14, the content of each request item, of which cause is not "O: Normal completion", is indicated as the rejection message in order.

FIG. 23 shows an example of the indication.

The operations of the double-registration avoidance system according to the present invention, which has the above-described structure are collectively explained as follows:

A plurality of the intercommunicative directory number updating commands, which are inputted by the system operator, are accumulated in the command buffer by the process for "accumulating the command (ID=1)" with the use of the structure shown in FIG. 14.

In the process of "checking the conflict between items (ID=2)", it is checked whether or not there is a conflict among the request items in the command buffer. The conflicting request items are discarded as "unnecessary" items.

Then, each request item, of which indication of necessity is "O: Necessity", is subjected to the updating processing in order of deletion, change and addition, according to the process of "updating the intercommunicative directory number (ID=3)". Then, the request items are connected to either of the line-formed or the ring-formed set of change items obtained on the process of "classifying the line/ring form (ID=3.2.1)", and the process of the process of "changing (ID=3.2.2)" is performed per a set of change items.

The main processor 1 sends the request items, to which the processing of "updating the intercommunicative directory number (ID=3)" has been completed and which are collected by the process of "communicating between processors (ID=4)", to the call-processor 2. The content of the request items not to be updated and the cause are indicated by the process of "notifying the cause (ID=5)".

Effectiveness of the present invention will be explained in conjunction with the detailed examples performed according to the double-registration avoidance system of the present invention.

Figure 24:
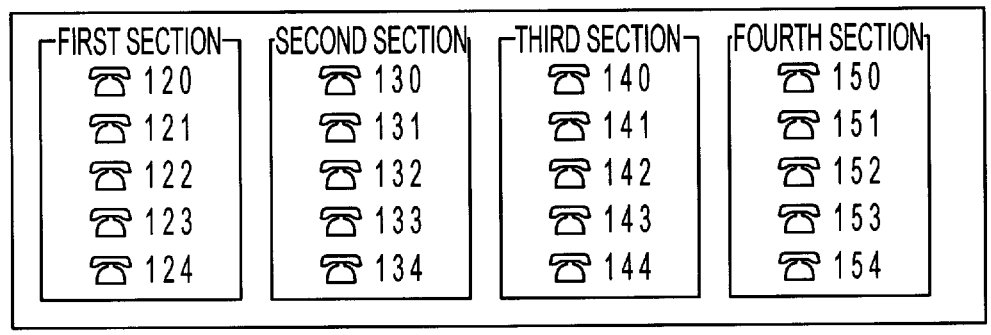
FIG. 24 is a diagram showing an example of an arrangement of directory number before moving (example 1).
Figure 25:
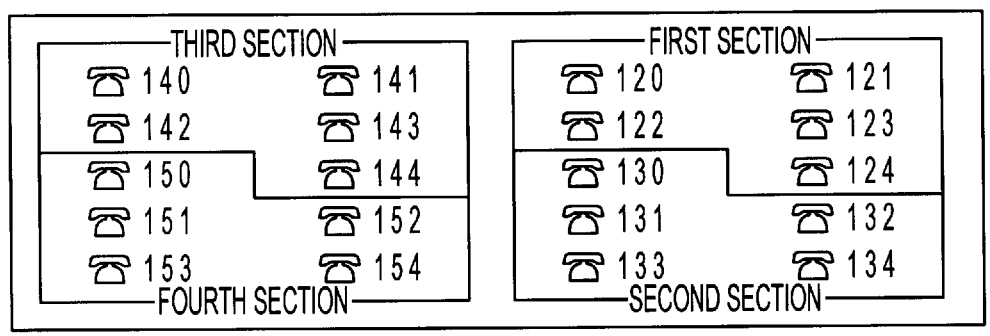
FIG. 25 is a diagram showing an example of an arrangement of directory number after moving (example 1).
Figure 30:
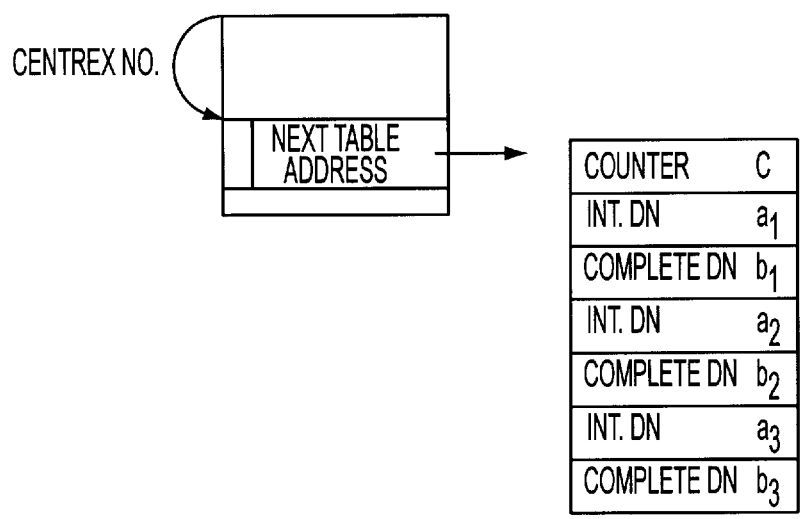
FIG. 30 is a diagram for explaining a conversion table.

More particularly, the present invention brings great effectiveness in the case where it is required to widely change the intercommunicative directory numbers, for example, due to a movement of subscribers' business sections. The case where the-business section having an arrangement of telephone lines as shown in FIG. 24 is changed to the sections having an arrangement of telephone lines as shown in FIG. 25 will be considered as follows.

To change the telephone lines, it is required to execute all of the directory number change commands as follows;

| | | | |
|---|---|---|---|
| 120 → 140 | 130 → 141 | 140 → 120 | 150 → 121 |
| 121 → 142 | 131 → 143 | 141 → 122 | 151 → 123 |
| 122 → 150 | 132 → 144 | 142 → 130 | 152 → 124 |
| 123 → 151 | 133 → 152 | 143 → 131 | 153 → 132 |
| 124 → 153 | 134 → 154 | 144 → 133 | 154 → 134 |

However, when employing the conventional system, all of the above-described change commands are rejected because of double-registration.

When employing the present system, the above-described change commands are changed to the sum of the sets of change items shown in FIG. 26. These sets 1 to 6 of change items are executable ring-formed sets. Therefore, all the directory numbers can be changed as shown in FIG. 25.

In the second example, when the arrangement shown in FIG. 27 is modified to that shown in FIG. 28, it is required to perform complex updating because of the mixture of deletion, change and addition. In this case, too, it is possible to easily execute the update commands according to the present system.

Further, it is also possible to indicate (1) the outputs of "checking conflict between items ID=2" i.e., the confliction between the request items, (2) the order of the request items arranged in order of deletion, change, and addition, (3) the outputs of "classifying line or ring form ID=3.2-1" i.e., the status of connecting directory numbers in each set of change items, and an information of the possibility of executing each set of change items to the system operator. Thereby, the processing of the system operator can be also simplified.

That is, the system operator can modify the conflicting request items, and plan to execute commands for avoiding the double-registration by arranging the commands in the suitable order. FIG. 29 shows one example of the indication of the notifying function.

If the system operator were input the commands one by one, the set of the ring-formed change items cannot be executed. In this case, it is possible to execute the set by employing directory numbers (dummy numbers), which are not in the CENTREX system.

As explained in the embodiments, according to the present invention, it is possible to automatically arrange commands to avoid the double-registration, even if a large number updating commands should be executed. Accordingly, it becomes possible to avoid increasing the load of communication between processors, and together sharply reduce operators' working time.

What is claimed is:

1. A double-registration avoidance method for use in registration of subscriber directory numbers, the method comprising the steps of
    accumulating a plurality of request commands for updating directory numbers of a plurality of subscribers;
    arranging the accumulated request commands;
    excluding conflicting request commands from the arranged and accumulated request commands;
    executing remaining request commands,
    wherein each of the request commands is either to add, change or delete a directory number,
    wherein the step of executing remaining request commands is performed sequentially in the order of deleting, then changing, and then adding, and
    wherein the step of changing includes the steps of:
        when a current directory number and a new directory number requested by two request commands of the remaining request commands to change the current and new directory numbers coincide, connecting the remaining request commands as having a nodal point of the two request commands;
        classifying the connected remaining request commands into two sets of chained forms, one being a ring-formed set, in which a connected chain of the directory numbers is returned to a starting point of the connected chain, and the other being a line-formed set, in which the connected chain of the directory numbers corresponding to the connected remaining request commands is not to be returned to the starting point of the connected chain;
        determining whether or not it is possible to perform changing of the directory numbers for each of the two sets of chained forms; and
        executing changing of the directory numbers which are determined possible to change for each of the two sets of chained forms.

2. The double-registration avoidance method according to claim 1, wherein the directory numbers include intercommunicative directory numbers and/or complete directory numbers.

3. The double-registration avoidance method according to claim 1, further comprising the step of determining whether all request commands connected in the line-formed set can be executed when a first request command connected to the forward direction of the line-formed set is executable, and further, determining whether all request commands connected in the ring-formed set can be performed.

4. A double-registration avoidance method for use in registration of subscriber directory numbers, the method comprising the steps of:
    accumulating a plurality of request commands inputted by an operator via a call processor for updating intercommunicative directory numbers;
    checking conflicting request commands within the accumulated request commands to exclude the checked conflicting request commands from the accumulated request commands; and
    executing remaining request commands to delete, then change, and then add directory numbers in that order,
    the step of executing remaining request commands to change including the steps of:
    classifying directory numbers corresponding to request commands to either of ring-formed and line-formed sets,
    executing changing of the directory numbers classified to each of the ring-formed and line-formed sets,
    returning request commands, for which the changing of the directory numbers has been executed, to the call processor, and
    indicating contents of request commands, which have not been able to execute and the causes of having not been able to execute.

5. The double-registration avoidance method according to claim 4, wherein a plurality of subscribers, to which the subscriber numbers are assigned, are connected to a PBX system.

6. The double-registration avoidance method according to claim 4, wherein a plurality of subscribers, to which the subscriber numbers are assigned, are connected to an office switch and grouped as a CENTREX.

7. A double-registration avoidance system for use in registration of subscriber directory numbers, the system comprising:
    a main processor having a main memory including a command buffer for storing request commands inputted by an operator, the request commands being to update intercommunicative directory numbers and a frame memory including a data section for storing data of a plurality of subscribers who receive calls and a converting table for converting between intercommunicative and complete directory numbers; and a call processor having a frame memory for storing data of a plurality of subscribers who send calls, the main processor accumulating in the command buffer a plurality of request commands for updating directory numbers of a plurality of subscribers, arranging the accumulated request commands, excluding conflicting request commands for the arranged and accumulated request commands, and executing remaining request commands, wherein each of the request commands is either to add, change, or delete a directory number, and when a current directory number and a new directory number requested by two request commands of the remaining request commands to change the current and new directory numbers coincide, the main processor connects the remaining request commands as having a nodal point of the two request commands, classifies the connected remaining request commands into two sets of chained forms, one being a ring-formed set, in which a connected chain of the directory numbers is returned to a starting point of the connected chain, and the other being a line-formed set, in which the connected chain of the directory numbers corresponding to the connected remaining request commands is not to be returned to the starting point of the connected chain, determines whether or not it is possible to perform changing of the directory numbers for each of the two sets of chained forms, and executes changing of the directory numbers which are determined possible to change for each of the two sets of chained forms.

8. The double-registration avoidance system according to claim 7, wherein in the command buffer causes of excluding for each accumulated and conflicting request command are written.

9. The double-registration avoidance system according to claim 7, wherein a plurality of subscribers, to which the subscriber numbers are assigned, are connected to a PBX system.

10. The double-registration avoidance system according to claim 7, wherein a plurality of subscribers, to which the subscribers numbers are assigned, are connected to as a CENTREX.

* * * * *